(12) United States Patent
Wycech

(10) Patent No.: US 6,863,957 B2
(45) Date of Patent: Mar. 8, 2005

(54) COMPOSITE STRUCTURAL REINFORCEMENT MEMBER

(75) Inventor: Joseph S. Wycech, Grosse Point Shores, MI (US)

(73) Assignee: Henkel Kommanditgesellschaft auf Aktien, Duesseldorf (DE)

(*) Notice: Subject to any disclaimer, the term of this patent is extended or adjusted under 35 U.S.C. 154(b) by 45 days.

(21) Appl. No.: 10/176,691

(22) Filed: Jun. 20, 2002

(65) Prior Publication Data
US 2003/0235675 A1 Dec. 25, 2003

Related U.S. Application Data

(62) Division of application No. 08/869,159, filed on Jun. 4, 1997, now abandoned, which is a division of application No. 08/448,627, filed on May 23, 1995, now Pat. No. 5,755,486.

(51) Int. Cl.[7] .............................. B32B 1/00; B32B 3/00; B60R 19/22; B60R 19/03
(52) U.S. Cl. .................. 428/174; 428/71; 428/119; 428/120; 428/122; 239/109; 239/120; 239/136
(58) Field of Search ............................. 428/174, 122, 428/119, 71, 120, 137; 293/109, 120, 136

(56) References Cited

U.S. PATENT DOCUMENTS

| | | |
|---|---|---|
| 3,103,406 A | 9/1963 | Milewski et al. |
| 3,123,170 A | 3/1964 | Bryant |
| 3,493,257 A | 2/1970 | Fitzgerald |
| 3,892,819 A | 7/1975 | Najvar |

(List continued on next page.)

FOREIGN PATENT DOCUMENTS

| | | |
|---|---|---|
| AU | B-38323/93 | 4/1993 |
| EP | 0383498 | 8/1990 |
| GB | 2067478 | 7/1981 |
| JP | 58-87668 | 5/1983 |
| JP | H03-118179 | 12/1991 |
| JP | 4059820 | 2/1992 |
| JP | 7-117728 | 5/1995 |
| JP | H07-031569 | 6/1995 |
| WO | 93/05103 | 3/1993 |

OTHER PUBLICATIONS

1990 Design News Article.

Primary Examiner—Harold Pyon
Assistant Examiner—Patricia L. Nordmeyer
(74) Attorney, Agent, or Firm—Stephen D. Harper

(57) ABSTRACT

A reinforced structural assembly comprises a structural member and a reinforcing member disposed adjacent to a wall of the structural member. The reinforcing member is an insert having a carrier portion and an expandable portion in the form of a one-part epoxy system having an outer surface disposed toward the wall of the structural member. The epoxy system contains in weight percent about 30% to about 70% epoxy resin and contains a filler in the form of hollow glass microspheres. The epoxy system is in the form of a high-viscosity dough so that in its uncured state it does not significantly flow from and remain supported by the carrier portion of the insert whereby the insert may be placed near the wall before the epoxy dough is cured to bond the dough to the wall when the dough is cured and expands into intimate contact with the wall.

18 Claims, 3 Drawing Sheets

U.S. PATENT DOCUMENTS

| | | |
|---|---|---|
| 4,019,301 A | 4/1977 | Fox |
| 4,238,540 A | 12/1980 | Yates et al. |
| 4,250,136 A | 2/1981 | Rex |
| 4,252,378 A | 2/1981 | DeBolt et al. |
| 4,595,623 A | 6/1986 | Dupont et al. |
| 4,598,106 A | 7/1986 | Utsugi |
| 4,737,407 A | 4/1988 | Wycech |
| 4,751,249 A | 6/1988 | Wycech |
| 4,769,391 A | 9/1988 | Wycech |
| 4,810,548 A | 3/1989 | Ligon et al. |
| 4,836,516 A | 6/1989 | Wycech |
| 4,853,270 A | 8/1989 | Wycech |
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,019,605 A | 5/1991 | Jannic |
| 5,089,311 A | 2/1992 | Ligon |
| 5,124,186 A | 6/1992 | Wycech |
| 5,213,391 A | 5/1993 | Takagi |
| 5,252,632 A | 10/1993 | Savin |
| 5,274,006 A | 12/1993 | Kagoshima et al. |
| 5,344,208 A | 9/1994 | Bien et al. |
| 5,453,453 A | 9/1995 | Lamon et al. |
| 5,470,886 A | 11/1995 | Makhlouf et al. |
| 5,506,025 A | 4/1996 | Otto et al. |
| 5,665,461 A | 9/1997 | Wong et al. |
| 5,712,317 A | 1/1998 | Makhlouf et al. |
| 5,755,486 A * | 5/1998 | Wycech .................. 296/187.02 |
| 6,270,600 B1 * | 8/2001 | Wycech ...................... 156/79 |

* cited by examiner

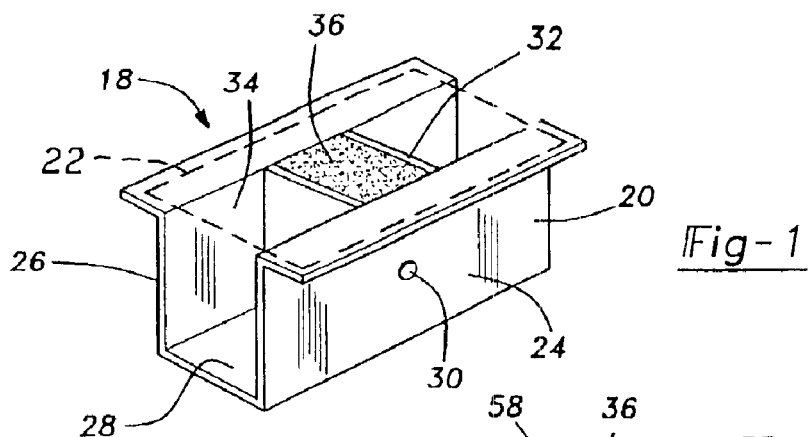
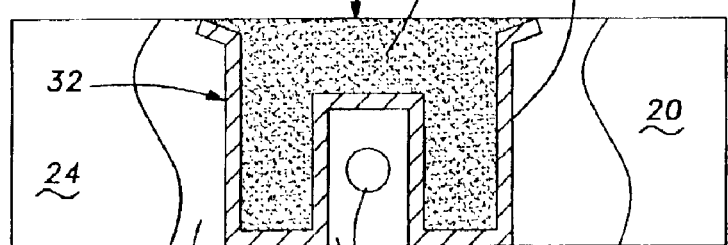
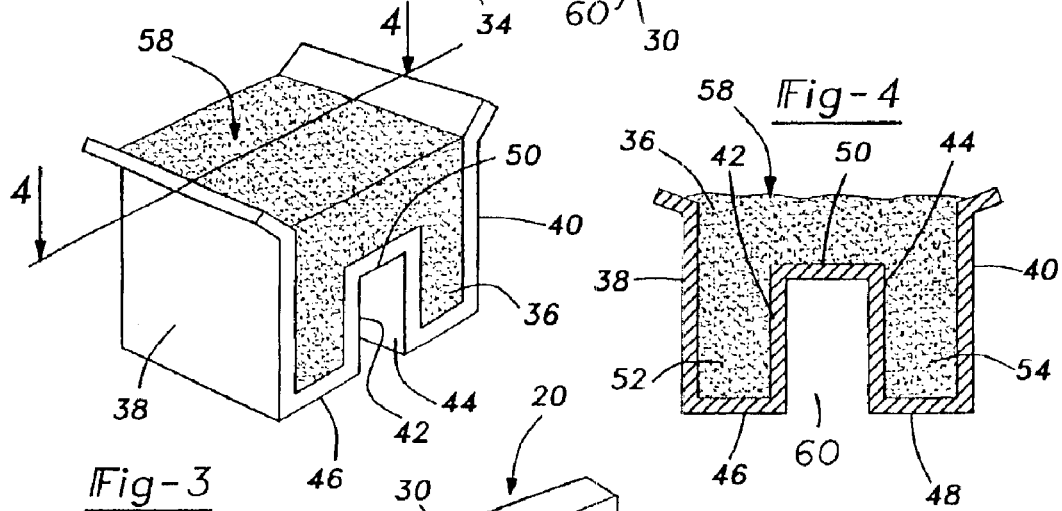
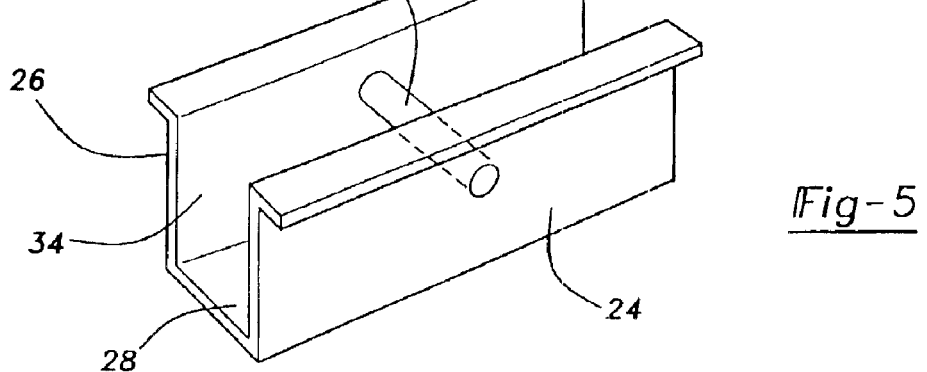

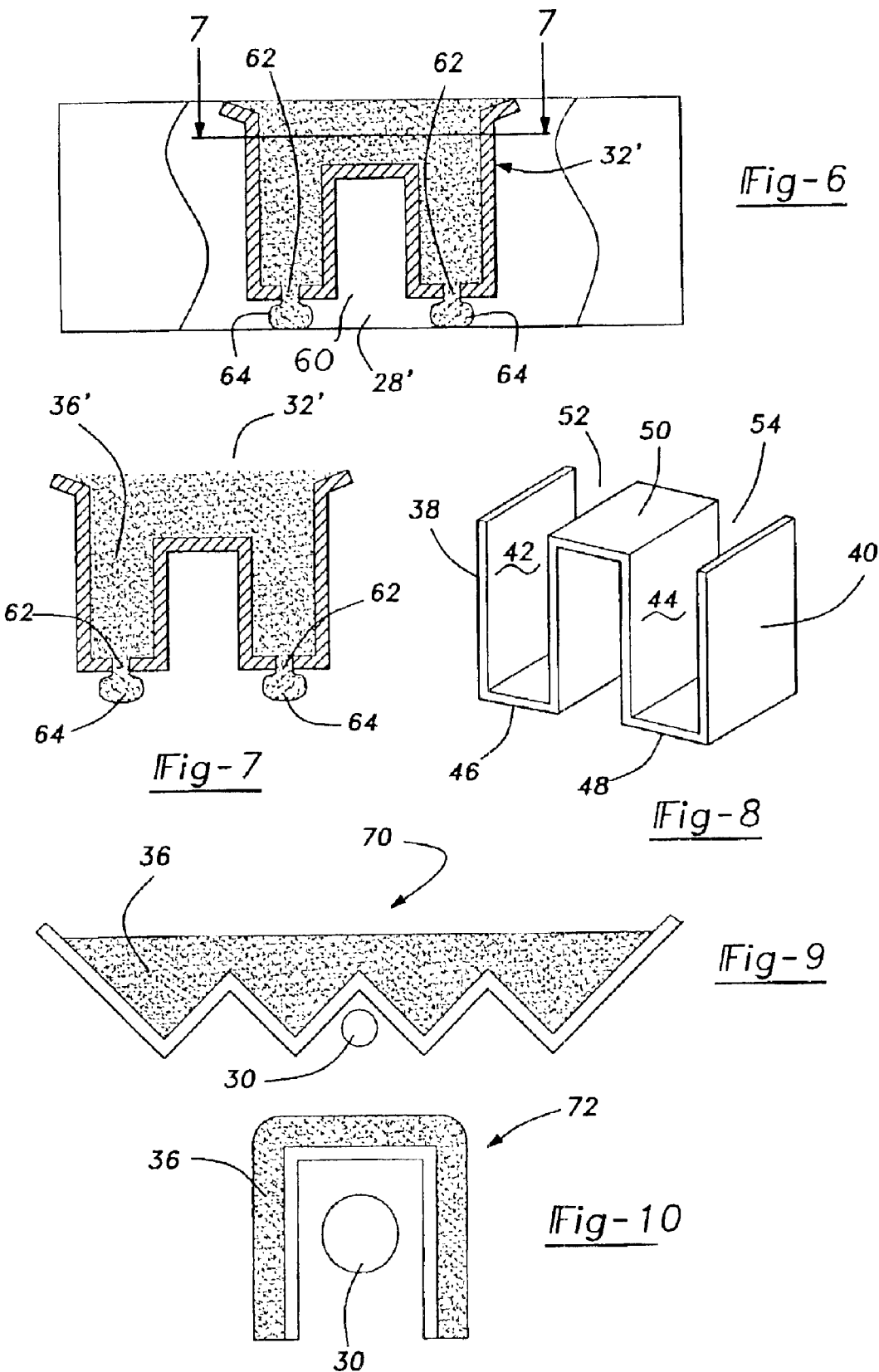

COMPOSITE STRUCTURAL REINFORCEMENT MEMBER

CROSS REFERENCE TO RELATED APPLICATIONS

This application is a division of application Ser. No. 08/869,159, filed Jun. 4, 1997, now abandoned, which in turn is a division of application Ser. No. 08/448,627, filed May 23, 1995, now U.S. Pat. No. 5,755,486.

TECHNICAL FIELD OF THE INVENTION

The present invention relates generally to automotive body structural members and, more specifically, relates to reinforcement members for increasing the strength of automotive body structural members.

BACKGROUND OF THE INVENTION

In a number of design applications, particularly in the automotive industry, it is essential to provide structural members which are light-weight and yet which have high strength characteristics. A number of exotic metal alloys and the like have been proposed by others in the past for use in forming high strength structural members; however, in some applications, including in the automotive industry, the cost of these alloys is typically prohibitive. Accordingly, there is a need for structural reinforcement members which are light-weight and low-cost and which can be used to compliment existing design structures.

There is a considerable body of prior art dealing with the reinforcement of motor vehicle structural components. In U.S. Pat. No. 4,901,500, entitled "Light-Weight Composite Beam," a reinforcing beam for a vehicle door is disclosed which comprises an open channel-shaped metal member having a longitudinal cavity which is filled with a thermosetting or thermoplastic resin-based material. In U.S. Pat. No. 4,908,930 entitled, "Method of Making a Torsion Bar," a hollow torsion bar reinforced with a mixture of resin with filler is described. The tube is cut to length and charged with a resin-based material.

In U.S. Pat. No. 4,751,249, entitled "Reinforcement Insert for a Structural Member and Method of Making and Using the Same," a precast reinforcement insert for structural members is provided which is formed of a plurality of pellets containing a thermosetting resin and a blowing agent. The precast is expanded and cured in place in the structural member. Also, in U.S. Pat. No. 4,978,562, entitled, "Composite Tubular Door Beam Reinforced with a Syntactic Foam Core Localized in the Midspan of the Tube," a composite door beam is described which has a resin-based core that occupies not more than one third of the bore of a metal tube.

In co-pending U.S. patent application Ser. No. 245,798 filed May 19, 1994, entitled "Composite Laminate Beam for Automotive Body Construction," a hollow laminate beam characterized by high stiffness-to-mass ratio and having an outer portion which is separated from an inner tube by a thin layer of structural foam is described.

Although in some applications, there are advantages to these prior art reinforcement techniques, there is a need to provide a reinforcement for rail sections which significantly increases the strength of the rail, particularly at stress points, in a manner which is not only low-cost, but also which adapts readily to mass production assembly.

In addition, it is known that cyanoguanidine is a commonly-used latent curing agent for foamed epoxy polymers. The most frequently used material has a nominal particle size of about 80 microns. For higher reactivity, micronized versions are sometimes used, e.g. 90% of particles less than 30 microns. In the prior art, conventional usage of curing agents may cause "burning" of the foamed polymer. This is because the heat from the exothermal curing reaction does not readily dissipate. This solution is, however, not practical when the temperature of the oven is pre-set for other conditions, i.e., paint curing the like.

SUMMARY OF THE INVENTION

In one aspect, the present invention provides a reinforced structural member. The reinforced structural member has a longitudinal cavity in which a reinforcement member is disposed. The reinforcement member includes a slot through which a pin or other engagement means extends. The pin is secured to opposed sidewalls of the structural member. The sides of the reinforcement member are open and the interior of the reinforcement member is filled with a resin-based material. The reinforced structural member is assembled by securing the pin in position and then dropping the reinforcement member which is filled with resin-based material over the pin. The open sides of the reinforcement member and the resin-based material therein are adjacent sidewalls of the structural member, with the pin passing through the open slot of the reinforcement member. The structural member, which may comprise a motor vehicle rail, moves through a primer oven whereupon the resin-based material expands and adheres to the sidewalls of the structural member to form a strong bond with the inner walls of the structural member. The expanded resin-based material effectively creates a single unitary structure comprising the reinforcement member, the expanded resin and the structural member.

In another aspect, openings in the reinforcement member adjacent the bottom of the structural member allow resin to expand through the openings and bond to still another surface of the structural member to provide even greater bonding of the reinforcement member to the structural member.

In still another aspect, the present invention provides a novel epoxy-based reinforcement material which contains epoxy resin, an elastomer, a filler, fumed silica, high strength glass spheres, along with curing agent, an accelerator and a blowing agent.

In the present invention, the overall strength of the structural member is significantly increased, reducing cracks at stress points where the reinforcement member is positioned.

BRIEF DESCRIPTION OF THE DRAWINGS

FIG. 1 is a perspective view of a portion of a rail member reinforced in accordance with the present invention.

FIG. 2 is a side elevational view of the rail member of FIG. 1 partially broken away to illustrate the placement of the reinforcement member and transverse pin.

FIG. 3 is a perspective view of the structural reinforcement carrier member before insertion into the hollow structural member of FIGS. 1 and 2.

FIG. 4 is a cross-section along lines 4—4 of FIG. 3.

FIG. 5 is a perspective view of the hollow structural member with transverse reinforcement pin prior to insertion of the reinforcement member.

FIG. 6 is a side elevational view of a hollow frame section partially broken away and reinforced in accordance with the present invention in another embodiment.

FIG. 7 is a cross-section of the reinforcement member of FIG. 6 along lines 7—7.

FIG. 8 is a perspective view of the reinforcement member of FIG. 3 without the resin-based core.

FIG. 9 is an elevational view of a reinforcement member in another configuration for use in the present invention.

FIG. 10 is an elevational view of a reinforcement member and retaining pin in another configuration for use in the present invention.

DETAILED DESCRIPTION OF THE PREFERRED EMBODIMENTS

Figure 11:
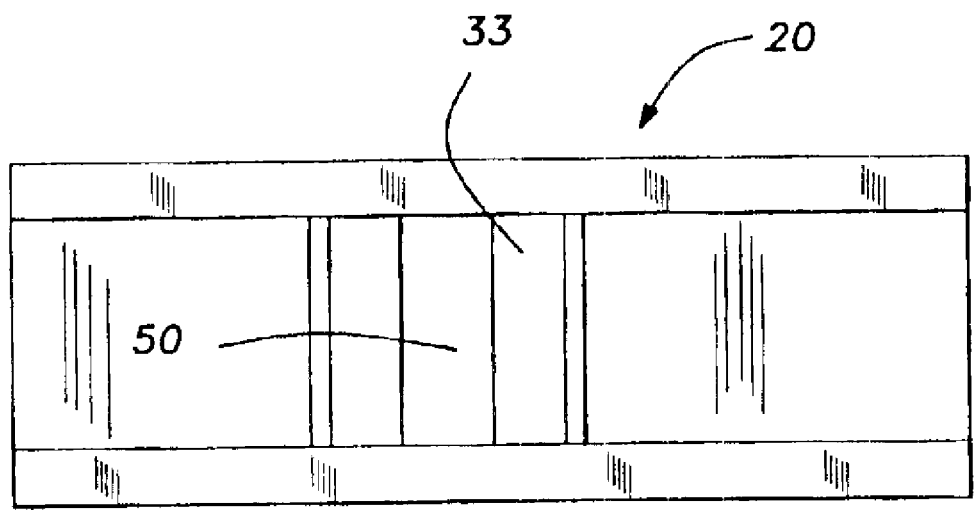
FIG. 11 is a plan view of the structure shown in FIG. 1, but with the resin-based core removed.

Referring now to FIG. 1 of the drawings, reinforced structure 18 is seen having hollow structural member 20 with top or closure plate 22 (shown in phantom). Structural member 20 has opposed sidewalls 24 and 26 and floor or bottom surface 28 and is thus in the nature of a channel-shaped member. Rod or pin 30 extends between opposed sidewalls 24 and 26 as best shown in FIG. 5 of the drawings. Pin 30 serves as a shock absorber attachment and as a retaining member for reinforcement member 32. Reinforcement member 32 is disposed within longitudinal channel or cavity 34 of hollow structural member 20 and has a carrier portion 33 (best shown in FIG. 8) which serves as a carrier or container for resin-based reinforcement/bonding material 36. In FIG. 2 of the drawings, sidewall 24 is shown partially broken away to reveal reinforcement member 32 and the end of pin 30.

Hollow structural member 20 is preferably formed of metal, for example steel, and is most preferably a rail of a motor vehicle. Accordingly, in the most preferred embodiment, reinforced structural member 18 is an automotive beam or rail.

Referring now to FIGS. 3, 4 and 8 of the drawings, carrier 33 has external sidewalls 38 and 48, internal sidewalls 42 and 44, lower walls 46 and 48 and a connecting wall 50 such that two channel-shaped cavities or reservoirs 52 and 54 are defined. As best shown in FIGS. 4 and 8, these walls define a c-shaped resin receiving cavity 56. In this fashion, resin-based reinforcement/bonding material 36 forms a c-shaped resin body structure or core 58.

Figure 12:
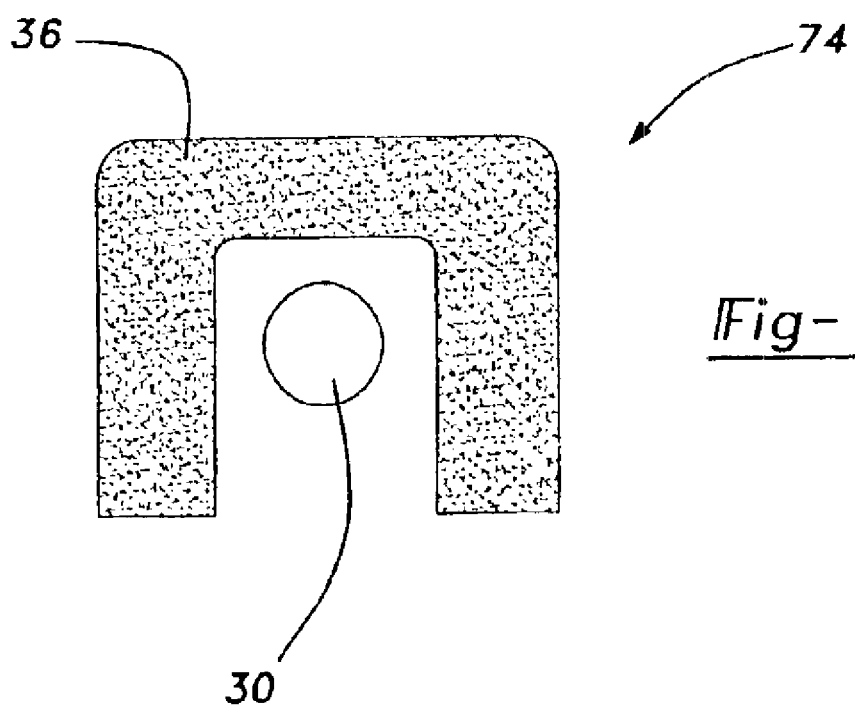
FIG. 12 is an elevational view of a reinforcement member in another configuration for use in the present invention.

It is to be understood that a number of geometries may be suitable for use as carrier 33 and that the w-design or configuration, while preferred, is only one such configuration. For example a corrugated configuration 70 as shown in FIG. 9 or an inverted u-shaped structure 72 as shown in FIG. 10 having an external coating of resin-based material (i.e. no external sidewalls) may be suitable in a given application. Also, it may be suitable to completely eliminate carrier 33 and utilize a free-standing resin body 74 as shown in FIG. 12. It is generally sufficient that reinforcement member 32 have means for containing or supporting a resin-based reinforcing body and means for interfacing with a position-locating retention means such as pin 30. Most preferably, carrier 33 will define one or more containment sites or reservoirs for the resin-based reinforcing/bonding material while still having openings such that the resin-based reinforcement/bonding material may expand and bond with sidewalls 24 and 26 of hollow structural member 20.

The gauge or thickness of carrier 33 may vary, but is typically between 0.025 and about 0.060. The dimensions of reinforcement member 32 should closely match channel 34 so that there are at least some points of contact between carrier 33 and sidewalls 24 and 26, but should not require that channel 34 be expanded for insertion of reinforcement member 32 during assembly. Pin 30 is preferably metal and, as stated, serves to retain reinforcement member 32 in place by engagement with slot 60 defined by internal sidewalls 42, 44 and connecting wall 50 of carrier 33. It is most preferred that any clearance between pin 30 and slot 60 be sufficiently small such that reinforcement member 32 does not move significantly even prior to expansion of resin-based reinforcement/bonding material 36. The composition of resin-based reinforcement/bonding material 36 as well as the method of assembly of reinforced structural member 18 will be described more fully below.

In still another embodiment of the present invention, referring now to FIGS. 6 and 7 of the drawings, reinforcement member 32' is shown having a plurality of openings or channels 62 through which resin-based material 36' flows during expansion in the assembly process. This forms additional bonding regions 64 on floor surface 28' of hollow structural member 20. By providing openings 62 in this manner, additional bonding and reinforcing strength is obtained for reinforced structure 18. In this embodiment, all other features of reinforced structural member 18 are identical to those described in connection with the embodiment shown in FIGS. 1 through 5.

A number of materials may be suitable for use in forming resin-based reinforcement/bonding material 36. Suitable materials should have sufficient body when uncured or partially cured so that the material does not significantly flow out of carrier 33 once formed and prior to inserting in channel 34. Thus, it will be appreciated that carrier 33 receives resin-based reinforcement/bonding material 36 in a preparatory step to form a unit which is subsequently dropped into channel 34. In addition to having sufficient body, it is important that resin-based reinforcement/bonding material 36 permanently expand to contact sidewalls 24 and 26 (and floor surface 28 in the embodiment shown in FIG. 6 and FIG. 7) and this permanent expansion provides the desired compressive strength. It is also important that resin-based reinforcement/bonding material 36 adhere strongly to the inner surfaces of carrier 33 as well as to sidewalls 24 and 26. Resin-based reinforcement/bonding material 36 must also be sufficiently thermally stable such that it does not degrade at the temperatures experienced in paint curing ovens and the like. Resin-based reinforcement/bonding material 36 should also be light-weight and low-cost and, in general, should impart excellent mechanical strength to reinforced structural member 18.

More specifically, resin-based reinforcement/bonding material 36 should have a density of from about 35 pounds per cubic feet to about 65 pounds per cubic feet prior to being fully cured and from about 25 pounds per cubic feet to 45 pounds per cubic feet once fully expanded in place. The compressive strength of resin body 58 (after expansion and curing) should be at least 1,000 pounds per square inch and more preferably about 1,500 pounds per square inch or greater. The bond between resin body 58 and sidewalls 24 and 26, where sidewalls 24 and 26 are steel, should be sufficient to maintain the intensity of the metal/cure bond. This minimizes separation of resin body 58 from sidewalls 24 and 26 as well as from carrier 33. Cured resin body 58 should be able to withstand temperatures in excess of 450° F. for short times absent any significant applied stress and temperatures up to about 175° F. for extended periods without exhibiting substantial heat induced distortion or segregation.

Resin body 58 may be formed in place in carrier 33 by closing the open sidewalls 39 and 41 of carrier 33 and injecting or pouring a liquid or paste like resin-based material therein. Material 36 may then be hardened in place by curing or cooling. Alternatively, resin body 58 may be preformed and then inserted into resin receiving cavity 56 which is defined by carrier 33.

One preferred material for use as resin-based reinforcement/bonding material 36 includes a synthetic resin, an expandable self-foaming agent, and a filler. All percentages herein are by weight unless otherwise indicated. In one embodiment, synthetic resin comprises from about 45% to about 70% by weight, and preferably from about 50% to about 60% by weight of resin body 58. A cellular structure is most preferred since it provides a low density, high strength material which is strong and yet light-weight. The self-foaming agent may comprise a chemical blowing agent such as azodicarbonamide or P, P'-oxybis (benzene sulfonyl hydrazide) which comprises from about 0.1% to about 10% and more preferably from about 0.5% to about 2% by weight of resin body 58. In addition, in some applications it may be preferable to use plastic microspheres which may be either thermosetting or thermoplastic and which are in their unexpanded state until reinforced structural member is heated to expand material 36. It is to be understood that material 36 is not fully expanded until after reinforcement 32 is in position in channel 34. Where blowing agents are utilized as a self-foaming agent, they comprise from about 0% to about 10% and more preferably from about 1.5% to about 3% by weight of resin body 58. A number of fillers are suitable, including glass or plastic microspheres, fumed silica, calcium carbonate, milled glass fiber and chopped glass strand. A filler comprises from about 20% to about 50% by weight and more preferably from about 25% to about 40% by weight of resin body 58.

Preferred synthetic resins for use in the present invention include thermosets such as one-part epoxy resins, vinyl ester resins, thermoset polyester resins, and urethane resins. The average molecular weight (number average) of the resin component is from about 1,000 to about 5,000,000. Where the resin component of the material 36 is a thermosetting resin, various accelerators such as modifiedureas and borontrichloride are included. A curing agent such as dicyandiamide is used to cure the resin. A functional amount of accelerator is typically from about 0.1% to about 5% of the resin weight with a corresponding reduction in one of the three components, resin, self-foaming agent or filler. Some thermoplastics may also be suitable.

A most preferred composition for use as material 36, and one which comprises another aspect of the present invention, is an uncured one-part epoxy system which is provided in the form of a high-viscosity "dough" that is placed in carrier 33 as described above. With the preferred one-part epoxy dough, the uncured material 36 and thus, reinforcement member 32 can be washed, phosphated or otherwise treated with alkaline or acidic solution without noticeable deterioration of material 36. Thus, material 36 in this embodiment is resistant to acids and bases in its uncured state. Particularly in automobile applications, this feature allows reinforcement member 32 to be inserted at an early stage in the production line.

Accordingly, in one preferred embodiment, material 36 contains in weight percent, from about 30% to 70% epoxy resin, from about 0% to 20% elastomers such as polybutyl rubber, acrylonitrile-butadiene rubber (ABR) or polyisoprene, from about 1% to 30% filler such as calcium carbonate, fumed silica, high strength glass microspheres and from about 0% to 10% blowing agent such as azodicarbonamide or P, P'-oxybis (benzene sulfonyl hydrazide).

In addition, material 36 further includes from about 2% to 10% curing agent such as dicyandiamide or cyanoguanidine. It has been discovered that the size of the particulate curing agent is an important feature of the preferred formulation of material 36. By providing a powdered or particulate curing agent wherein 40% of the particles are greater than 15 microns in diameter, which is fully blended with the other constituents of material 36, even curing with no thermal degradation may be obtained at the temperatures experienced in automotive priming ovens. In other words, by utilizing a one-part epoxy resin containing blends of cyanoguanidine which have a high coarse particle content, no "burning" or reduced levels of "burning" of the interior of the cured epoxy foam mass.

From about 0% to 5% accelerator, such as modified ureas or borontrichloride is also preferably included in material 36. From about 0% to 10% carbon black may also be included.

In the most preferred embodiment, material 36 includes from about 1% to 6% hydrophobic silica and from about 18 to 27 high strength glass spheres which range from about 20 microns to about 400 microns in diameter. The high strength spheres should have a hardness (crush resistance) of at least 500 psi.

The most preferred epoxy resins are solid bisphenol A and solid bisphenol F including liquid epoxy resin. One such epoxy resin is sold as DGEBPA resin by The Peninsula Polymer Company.

The most preferred elastomer is acrylonitrile-butadiene rubber which is sold as NIPOL 1312 by The Zeon Company of Kentucky.

A preferred filler is stearic acid treated calcium carbonate sold as WINNOFIL SPT by The Zeneca Company of Massachusetts.

The preferred fumed silica are sold as CAB-O-SIL TS 720 by The Cabot Company if Illinois.

The preferred high strength glass spheres are sold as B38 Glass Bubbles by The 3M Company of Minnesota.

The most preferred curing agent, cure accelerator and blowing agent are sold as Dicyandimine G sold by SKW of Georgia, AMICURE UR (Air Products Company of Pennsylvania) and CELOGEN OT (Uniroyal Company of Connecticut, respectively.

In the most preferred embodiment, the preparatory material (uncured) 36, should have a dough-like consistency. Material 36 can be prepared by conventional techniques such as mixing the various components together.

In the following table, a preferred formulation for resin-based reinforcement/bonding material 36 is set forth. It is to be understood that this formulation is merely preferred and that other formulations may be suitable in a particular application.

TABLE I

|  | WT. % |
|---|---|
| Epoxy Resin | 50.45 |
| Acrylonitrile-Butadiene Rubber | 4.33 |
| Calcium Carbonate | 5.81 |
| Carbon Black | 0.13 |
| Fumed Silica | 3.55 |
| High Strength Glass Spheres | 22.40 |

TABLE I-continued

| | WT. % |
|---|---|
| Curing Agent | 4.33 |
| Accelerator | 1.29 |
| Blowing Agent | 0.71 |

For assembly of reinforced structural member 18, and referring now to FIGS. 1 and 3 of the drawings, resin-based reinforcement/bonding material 36 is prepared and placed in carrier 33 as previously described. A number of filled reinforcement members 32 may be prepared at one time and stored for future use. It is to be understood that at the point of time when reinforcement member 32 is to be dropped into channel 34, resin-based reinforcement/bonding material 36 is of a high viscosity such that it is retained within reinforcement member 32, but it is still capable of expanding and fully curing or solidifying to form a rigid structure (resin body 58) in channel 34 in combination with carrier 33. Bores are drilled through sidewalls 24 and 26 and pin 30 is inserted therein. It will be appreciated that the function of pin 30 is to retain reinforcement member 32 in place in channel 34 and that other securing means such as nubs or the like extending only partially from each opposed sidewall 24 and 26 may be suitable or desirable in any given application. Other retaining means may also be suitable. Preferably, pin 30 is welded in place such that it extends across channel 34 as best shown in FIG. 5 and provides strength to structure 18.

Reinforcement member 32 is dropped into channel 34 such that pin 30 slides into slot 60 thereby securing reinforcement member 32 in place (i.e. reinforcement member 32 is restrained from movement longitudinally along channel 34). In the embodiment shown in FIG. 1, top plate 22 is then placed on hollow structural member 20 and welded in place such that channel 34 is completely closed. As the motor vehicle moves through a paint oven, resin-based reinforcement/bonding material 36 thermally expands to form rigid resin body 58 which, as stated, locks reinforcement member 32 in channel 34. In other words, once expanded and fully solidified or cured, reinforcement member 32, resin body 58 and opposed walls 24 and 26 form an integral mass of material that adds significant strength to reinforced structural member 18. Although the time and temperatures may vary considerably depending upon the choice of materials used to form resin-based reinforcement/bonding material 36, with the preferred formulations set forth in the foregoing tables, material 36 should be heated to a high enough temperature, depending upon the amount of accelerator, cure agent, and mass.

Reinforced structure 18 has a number of advantages over prior art structures. By strategic placement of reinforcement member 32 at stress points, metal fatigue and cracking may be reduced without the use of heavy gauge metals to form structural member 20. Thus, it is preferred that carrier 32 occupies less than one-half the volume of structure 20, i.e., of cavity 34. It will be appreciated also that the preferred configuration of carrier 33 results in the formation of a series (three in the preferred w-shaped design) of u-shaped or column-shaped structures that extend between sidewalls 24 and 26. Resistance to compressive forces and torque of pin along an axis through sidewalls 24 and 26 and thus along the length of the columns is significant.

It will be appreciated that carrier 33 acts as a container for resin body 58 which keeps the body 58 from bulging, cracking and spalling, as well as acting as a handling mechanism. This is particularly important where resin body 58 is the primary load bearing unit. In turn, resin body 58 stabilizes carrier 33 such that carrier 33 does not buckle prior to the time resin body 33 acts as a support structure.

While a particular embodiment of this invention is shown and described herein, it will be understood that the invention is not to be limited thereto since many modifications may be made, particularly by those skilled in the art, in light of this disclosure. It is contemplated therefore that the present invention cover any such modifications as does fall within the true spirit and scope of this invention.

What is claimed is:

1. A reinforced structural assembly comprising a structural member having at least one wall, a reinforcing member disposed adjacent to said wall, said reinforcing member having a carrier portion and an expanded portion, said carrier portion supporting said expanded portion, said expanded portion being bonded to said wall of said structural member and being bonded to said carrier portion, said expanded portion in its unexpanded form being a one-part epoxy system having an outer surface disposed toward said wall of said structural member, said epoxy system containing in weight percent about 30% to about 70% epoxy resin and containing a filler in the form of hollow glass microspheres, said epoxy system being in the form of a high-viscosity dough so that said epoxy dough in its uncured state does not significantly flow from and remains supported by said carrier portion without the need for additional restraining structure at said outer surface to form a unit with said carrier portion whereby said unit may be placed near said wall before said epoxy dough is cured to bond said unit to said wall when said, epoxy dough is cured and expands into intimate contact with said wall, said epoxy dough being resistant to acid and bases in its uncured state, said epoxy dough having a compressive strength after expanding and curing of at least 1000 psi, and said epoxy dough having a density of about 35 pcf to about 65 pcf before being fully cured and from about 25 pcf to about 45 pcf after being fully expanded.

2. The assembly of claim 1 wherein said epoxy system contains in weight percent about 0% to about 20% elastomer, about 1% to about 30% filler and about 9% to about 10% blowing agent.

3. The assembly of claim 2 wherein said elastomer is polybutyl rubber.

4. The assembly of claim 1 wherein said epoxy dough is thermally expandable, and said epoxy dough when cured being able to withstand temperatures up to about 175° F.

5. The assembly of claim 1 wherein said carrier portion has a planar surface which supports said epoxy dough.

6. The assembly of claim 1 wherein said carrier portion has a multiplanar surface which supports said epoxy dough.

7. The assembly of claim 1 wherein said carrier portion has a nonplanar surface which supports said epoxy dough.

8. The assembly of claim 1 wherein said carrier portion has an outer surface which supports said epoxy dough.

9. The assembly of claim 1 wherein said structural member is metal.

10. The assembly of claim 1 wherein said structural member is one of a vehicle beam and a vehicle rail.

11. The assembly of claim 1 wherein said structural member is channel shaped and has at least three walls, and said epoxy dough upon curing and expansion being bonded to at least two of said walls.

12. An insert for reinforcing a structural member having at least one wall, said insert having a carrier portion and an expandable resin-based reinforcement/bonding material, said carrier portion having a support surface, said reinforcement/bonding material being supported by said support surface, said reinforcement/bonding material in its unexpanded form being a one-part epoxy system having an exposed surface for being disposed toward the wall of the structural member, said epoxy system containing in weight percent about 30% to about 70% epoxy resin and containing a filler in the form of hollow glass microspheres, said epoxy system being in the form of a high-viscosity dough so that said epoxy dough in its uncured state does not significantly flow from and remains supported by said support surface of said carrier portion without the need for additional restraining structure at said exposed surface to form a unit with said carrier portion whereby said unit may function as a preformed insert to be disposed near the wall of the structural member before said epoxy dough is cured and before said reinforcement/bonding material is expanded, epoxy dough is cured and expands into intimate contact with said wall, said epoxy dough being resistant to acid and bases in its uncured state, said epoxy dough having a compressive strength after expanding and curing of at least 1000 psi, and said epoxy dough having a density of about 35 pcf to about 65 pcf before being fully cured and from about 25 pcf to about 45 pcf after being fully expanded.

13. The insert of claim 12 wherein said epoxy system contains in weight percent about 0% to about 20% elastomer, about 1% to about 30% filler and about 9% to about 10% blowing agent.

14. The assembly of claim 13 wherein said elastomer is polybutyl rubber.

15. The assembly of claim 12 wherein said epoxy dough is thermally expandable, and said epoxy dough when cured being able to withstand temperatures up to about 175° F.

16. The insert of claim 12 wherein said support surface is planar.

17. The insert of claim 12 wherein said support surface is multiplanar.

18. The insert of claim 12 wherein said support surface is nonplanar.

* * * * *

UNITED STATES PATENT AND TRADEMARK OFFICE
CERTIFICATE OF CORRECTION

PATENT NO.    : 6,863,957 B2
DATED         : March 8, 2005
INVENTOR(S)   : Wycech It is certified that error appears in the above-identified patent and that said Letters Patent is hereby corrected as shown below:

Title page,
Item [75], Inventor, delete "Point" and insert -- Pointe --.

Signed and Sealed this

Sixth Day of December, 2005

JON W. DUDAS
*Director of the United States Patent and Trademark Office*